Patented Nov. 5, 1940

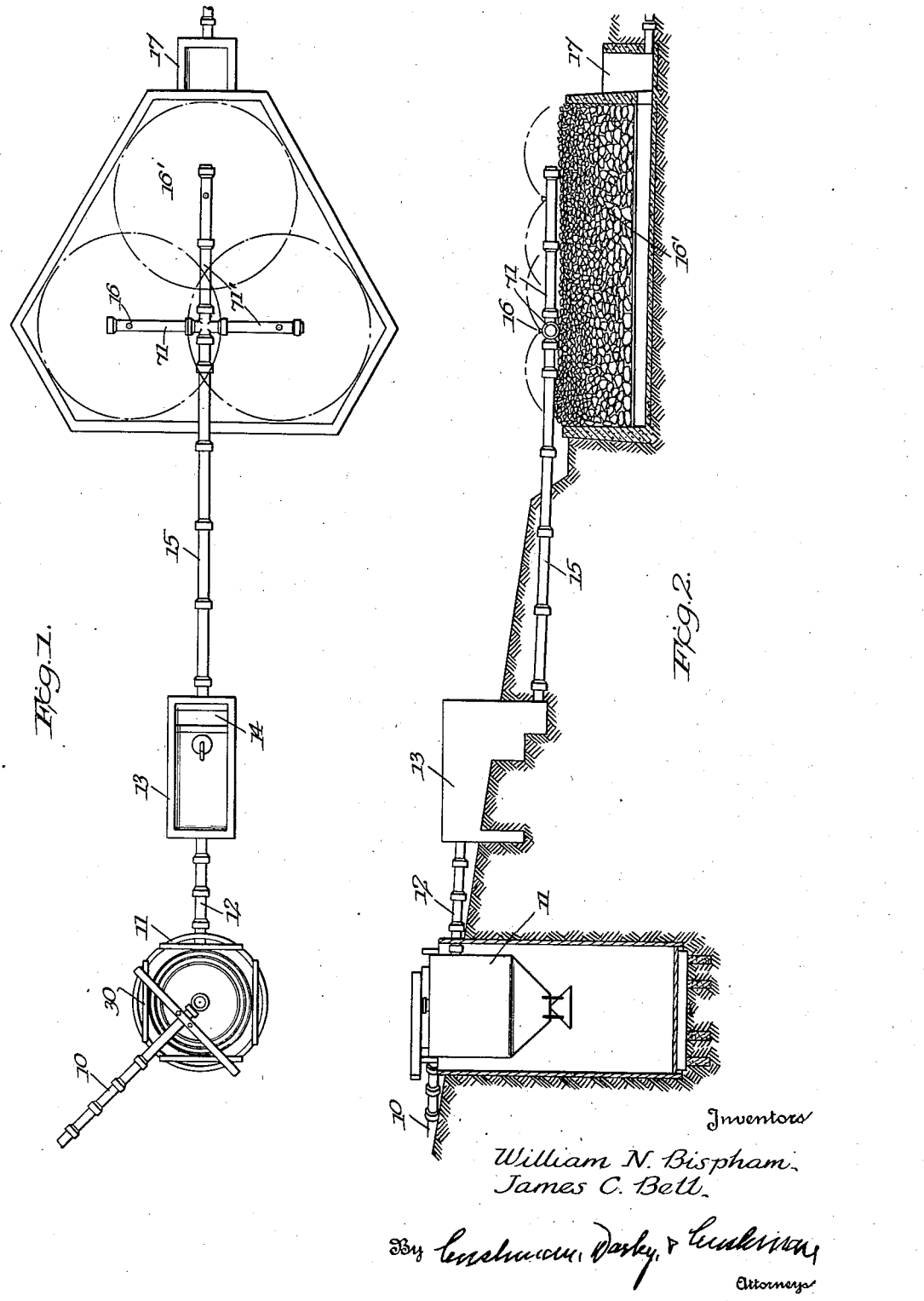

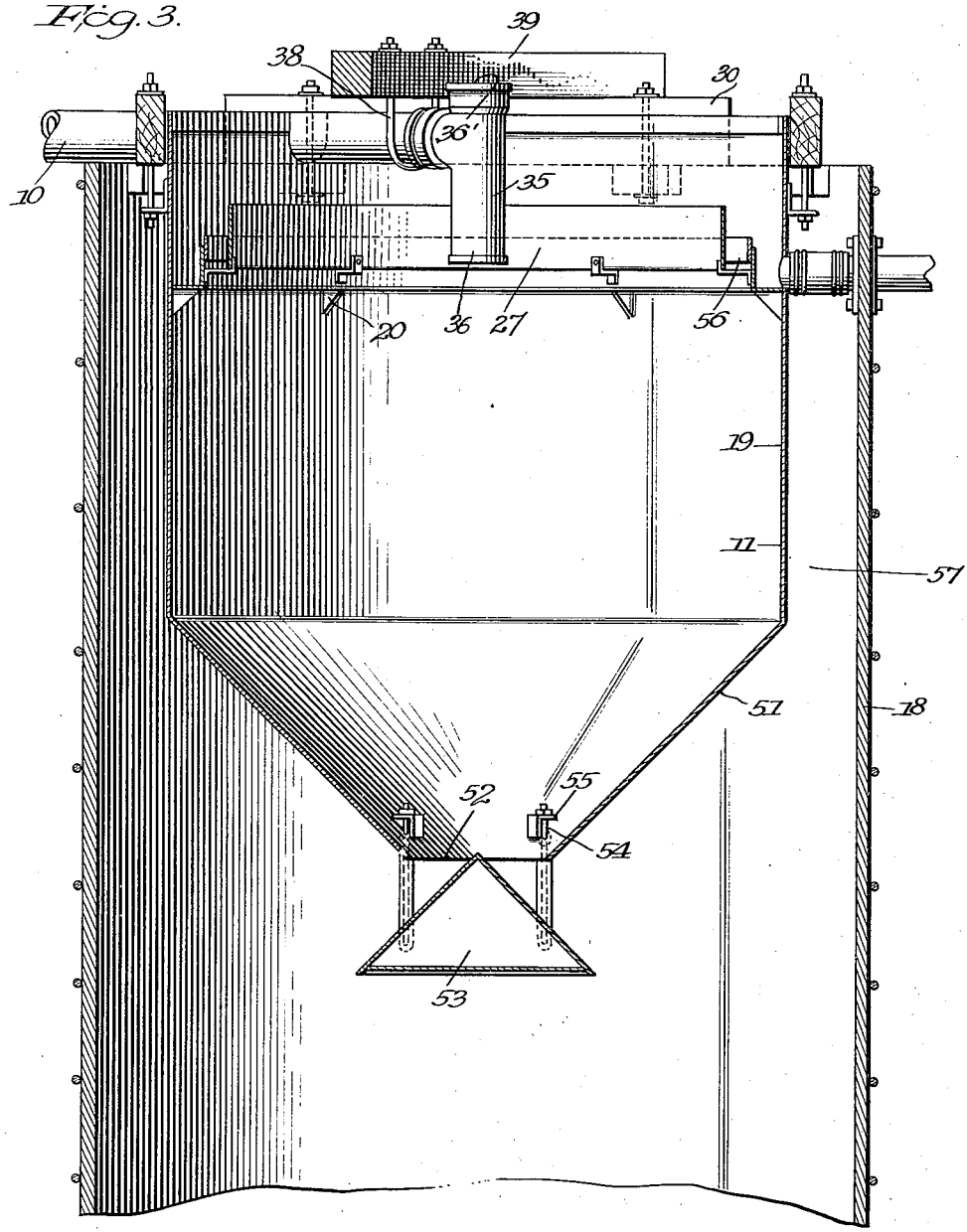

2,220,859

UNITED STATES PATENT OFFICE 2,220,859

METHOD AND APPARATUS FOR TREATING SEWAGE

William N. Bispham and James C. Bell, Baltimore, Md.

Application October 5, 1937, Serial No. 167,438

7 Claims. (Cl. 210—7)

The present invention relates to a sewage disposal system and particularly embodies a method and apparatus useful for treating relatively small gallonage, for example, at camps and municipalities, the requirements of which do not justify the installation of elaborate equipment. The present invention is simple and inexpensive, and the installation and operating costs are fractional compared to those incident to the equipping of the usual sewage disposal plant.

The primary object of the invention is to provide a reliable, continuous, automatic system requiring practically no supervision and which includes relatively few parts of inexpensive character whereby the entire plant may be easily installed and operated without the necessity for highly skilled labor and engineering experience.

Another object of the invention is to provide a system which will be highly efficient and in which the bio-chemical oxygen demand of the treated sewage will be sufficiently low as to permit its discharge into a small quantity of diluting water. In other words, tests of the treated sewage have shown that the organic matter has been stabilized to such an extent that the treated effluent may be safely disposed of by discharge into a stream or river without danger of upsetting the normal stability of the stream.

The system embodies (1) a settling and digestion apparatus from which the clarified effluent is continuously discharged to (2) a flow control chamber, the latter draining to (3) a suitable spray nozzle device disposed above a trickling filter or filter bed.

It is an important object of this invention that the discharge of the effluent upon the filter bed during the draining of the control chamber is constantly in the form of a spray and there is substantially no trickling of the effluent at the spray nozzles, i. e., weeping.

It is a further and particular feature of the invention that the spray from each nozzle is first of progressively increasing diameter and then of progressively decreasing diameter about the nozzles as centers, during draining of the control chamber, i. e., the dosing period under the control of the flow control chamber, so that substantially equal volumes of effluent are brought into contact with each unit area of the filter bed. The elimination of weeping at the nozzles also contributes to this result, in that as will be appreciated, puddling in the filter bed area surrounding the nozzles is avoided.

The method of the invention therefore includes such control that a uniform distribution of the effluent upon the filter bed is produced, assuring that a maximum aerobic bacterial action upon the effluent will be obtained at the filter bed.

The settling tank in the present system is disposed within a suitable digestion chamber or casing, and the settleable materials pass from the tank into the casing and are there subjected to anaerobic bacterial action. The settling tank and digestion chamber have means for preventing the setting up of currents such as would either disturb the proper settling of the heavier solids or interfere with the efficient collection of the usual scum. Also the settling tank includes means such as a scum board for separating and collecting the lighter materials. Associated with the settling tank is a weir over which the clarified effluent flows uniformly and continuously from the settling tank to the control or dosing chamber. This weir is made adjustable so as to enable proper leveling whereby the overflow will be constant at all points. From the weir, the clarified effluent is collected in a trough and carried by a line to the dosing tank or flow control chamber and a flexible connection is interposed in the line to compensate for any adjustment of the weir relative to the line. The settling tank furthermore carries means for assuring that the heavy matter will be uniformly distributed into the digestion chamber and includes means for preventing the entry or return of gases created by the digestive action into the settling chamber to thereby eliminate the presence of vertical currents which might interfere with a proper settling action. In this connection, the gases formed as a result of the digestion are caused to pass out between the wall of the casing and the wall of the settling tank.

The flow control or dosing tank embodies a main chamber of relatively large area and a supplemental chamber of less area but of appreciably greater depth. The two chambers are in communicating relation by means of an air actuated syphon. A head of clarified effluent first builds up in the main chamber and at a predetermined pressure, unlocks the syphon and the effluent discharges into the supplementary chamber from which it drains into a line leading to the spray nozzles. The supplemental chamber acts as a hydraulic cushion to balance the initial surge due to the entry of the effluent at high velocity, and after the main chamber has become substantially completely drained, i. e., the water level in the primary chamber lowers to a point where air is permitted to enter the bell of the syphon which automatically locks the discharge action thereof cutting off flow from the main to the supplemental chamber, the discharge of effluent continues from the supplemental chamber until the same is exhausted. In this manner, the spray discharged by each nozzle initially increases in diameter about the nozzle opening as a center to a maximum at which point the syphon locks and thereafter the discharge is from the supplemental chamber and the diameter of the spray about each nozzle as a center gradually decreases until the effluent in the supplemental chamber is exhausted. By having the supplemental chamber of appreciable depth, the head of effluent is sufficient to cause the effluent to be discharged as a spray until the supplemental chamber is exhausted, thereby avoiding any trickling at the nozzle opening usually described as weeping of the nozzles. Furthermore, the progressive increase in diameter as the main chamber is discharged, and the progressive decrease in diameter after the syphon is locked and the supplemental chamber is discharging not only assures that the effluent will be continuously discharged as a spray but moreover makes possible the uniform distribution of the effluent in substantially equal volumes per unit area of the filter bed throughout the whole area of the filter bed. As will be appreciated, this assures efficient aerobic bacterial action.

The relationship between the size of the openings of the spray nozzles and the area of the main chamber and area and depth of the supplemental chamber of the control chamber have a relationship which is critical, in order to assure that throughout the draining of effluent from the control chamber, the discharge of the spray nozzles will be constantly in the form of a spray which as stated is of progressively increasing diameter as the main chamber discharges and progressively decreasing diameter as the supplemental chamber is emptied.

In the accompanying drawings, we have illustrated a preferred construction which it is to be understood is capable of modification and change and the invention is, therefore, not to be considered as limited to this construction shown.

Referring to the drawings:

Figure 1 is a top plan schematic view.

Figure 2 is a side schematic view partly in section.

Figure 3 is a sectional view of the settling and digesting tank.

Figure 4:
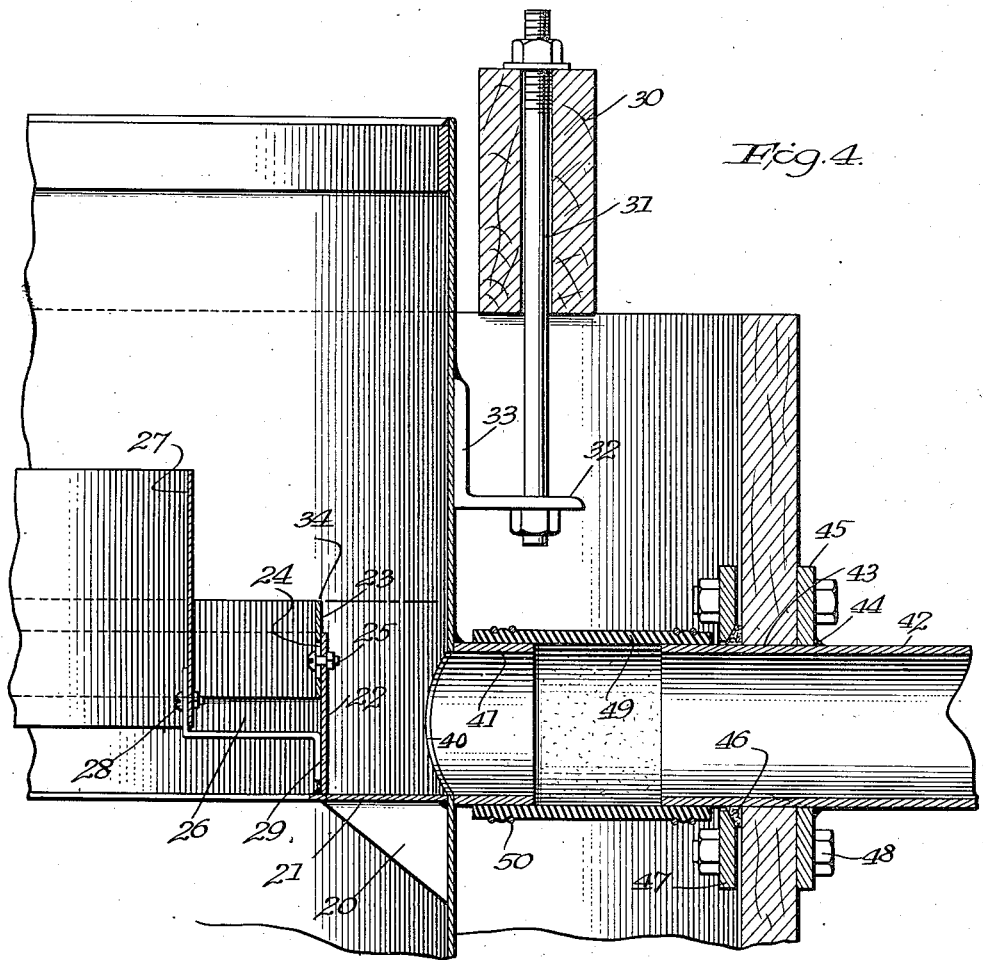
Figure 4 is a fragmentary, enlarged section similar to Figure 3, taken through the discharge pipe.

The construction illustrated in the drawings is particularly useful under conditions where there is a relatively small gallonage to be treated, as in camps and small suburban communities. However, the invention is useful in treating sewage from substantially any source, and will be equally efficient when installed in large communities, factories, and other places where stream pollution is to be avoided.

Referring to Figure 1, we have illustrated at 10 a line which feeds the raw sewage to a settling tank 11. There may be interposed in the line 10 a strainer (not shown) of the type to catch large objects and heavy insoluble bodies, and while it is preferred that the line 10 discharge by gravity to the tank 11, in some cases, it is necessary to pump the sewage to the tank.

In the tank 11 the heavy matter is allowed to settle, and the lighter floating substances are skimmed off, while the effluent thus treated is permitted to continuously flow from tank 11 by a line 12 to the dosing or control tank 13. In this dosing tank the effluent is allowed to collect to a predetermined level, at which point it unlocks an air syphon, allowing the effluent to enter a secondary chamber indicated at 14, which is drained at its bottom by a line 15 terminating in a suitable number of spray nozzles 16 which are disposed above a filter bed or trickling filter 16', the outlet for which is indicated at 17. The system operates continuously and automatically, as previously explained.

Referring to Figures 3 and 4, we have illustrated at 18 a casing which may be constructed of wood, metal, or concrete, in which the settling tank 11 is suspended. This casing 18 is preferably placed in the ground and is of required size. The tank 11 has a cylindrical body portion 19, which, adjacent its upper end, has welded thereto a plurality of spaced brackets for supporting a horizontally disposed ring 21 welded at its ends to the wall 19 and to the brackets, respectively. Carried by the ring 21 is a circular band or ring 22, which is welded along its lower circumferential edge to the top of the ring 21. Adjustably carried by the band 22 is a circular band 23 verically adjustable with respect to the band 22 by means of spaced slots 24 and bolts 25. The members 22 and 23 constitute a weir and in cooperation with the ring member 21 define the weir trough of the tank 11. Supported by the band 22 at spaced points as by means of brackets 26 is a cylindrical scum board or band 27, the brackets 26 being preferably bolted to the board 27 as shown at 28 and welded to the ring 22, as shown at 29. It will be noted that the upper edge of the scum board terminates above the upper edge of the weir, while its lower edge terminates above the lower edge of the weir.

The tank 19 is supported to depend within the casing 18 from bars 30 supported by the top edge of the casing and in which are threaded bolts 31 connected to spaced brackets 32 welded to the outside wall of the tank 19, as shown at 33. In this manner, the tank 19 is made adjustable for the purposes of levelling it and the weir 22—23 supported by the tank. An additional adjustment is provided for the weir through the medium of the adjustable connection 24—25. This is important, in order to assure a continuous and uniform flow constantly over the upper circular edge 34 of the band 23 into the weir trough.

The line 10 terminates in a T-shaped member 35 opening downwardly within the tank 11, as shown at 36, and this T-member 35 is preferably disposed centrally, and is of a length to introduce the raw sewage below the liquid level 37 of the tank a sufficient distance to avoid the formation of currents which might disturb the proper settling of the heavier particles contained in the effluent. As shown in Figure 3, the line 10 and outlet 35 are suitably supported by means of a yoke 38 extending from a bar 39, which is supported upon the top of one or more of the bars 30. The opposite end 36' of the T-shaped member is also open to avoid creating a pressure within the settling tank.

Referring to Figure 4, the weir trough is provided with an opening 40 in the wall 19 of the tank 11, about which opening there is welded exteriorly a short pipe section 41. A pipe section 42 is also disposed in a closely aligned opening 43 in the wall of the casing 18, which pipe section is welded as shown at 44 to an external washer 45 surrounding the opening 43 and the pipe 42. Interiorly the pipe 42 is surrounded by a packing 46, which is engaged by a washer 47, and the packing and washers 45—47 are secured upon the wall 18 by means of the bolts 48. If it should be necessary to remove the pipe 42 for any reason, loosening of the bolts 48 will enable the pipe section 42, the washer 45 and the bolts 48 to be removed as one piece. Since the tank 11 is adjustably mounted, we provide a flexible connection 49 for the opposed ends of the pipes 41 and 42. This connection may be of metal, but is preferably a piece of rubber hose which is suitably secured as by wiring about the ends of the pipes as shown at 50.

The bottom of the tank 11 below the cylindrical portion 19 is conical, as shown in Figure 3 at 51, and terminates in an opening 52. Supported by the conical bottom 51 with its apex in opposed relation to the opening 52, is a cone 53. This cone is adjustably supported by the bottom 51, through the medium of bolts or rods 54 threadedly mounted in brackets 55 carried by the bottom. The function of this cone is first to assure a uniform distribution of the solids contained in the effluent and discharging through the opening 52, and second to prevent the return or entrance into the tank 11 of gas bubbles developed by the digestion of the heavy solid matter in the casing 18.

From the above description, it will be observed that the raw sewage or the sewage which has been given a preliminary straining to remove heavy objects, is introduced through the outlet 35 centrally and downwardly below the sewage level in the tank 11. As explained, the point within the tank 11 relative to the liquid level at which the sewage is introduced, i. e., the length of the outlet 35, is controlled so as to avoid setting up currents which might interfere with proper settling of the heavy matter. The lighter matter in the tank 11 rises to the top and is skimmed by the circular scum board 27, while the liquid effluent containing colloidal matter passes through the circular opening 56 defined between the scum board 27 and the weir 22—23, over the upper edge 34 of the weir, and into the weir trough defined by the bottom 21 and the weir 22—23.

The heavy solid matter, because of the quiescent conditions present in the tank 11 obtained by the construction just described, settles to the bottom of the tank 11, and passes into the casing 18. This heavy solid matter is subjected to anaerobic digestion in the casing 18 in the well known manner. The cone 53, as explained, assures uniform distribution of the heavy solid or settled matter, and at the same time prevents the return of gas bubbles induced by the digestion action. In this connection, such gas bubbles, in the apparatus described, pass out of the tank through the cylindrical space defined between the walls of the tanks 11 and 18, as shown at 57. The effluent collecting in the weir trough discharges continuously through the pipes 41, 49 and 42 to the dosing or control chamber which will now be described.

Figure 5:
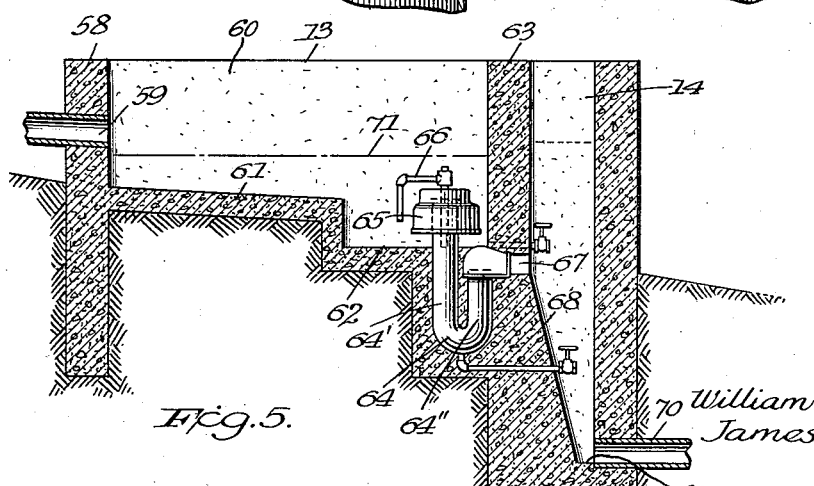
Figure 5 is a detailed view in section showing the dosing tank including the supplemental chamber and air syphon.

Referring to Figure 5, the line 12 with which the pipe 42 communicates enters one wall, preferably the rear wall 58 of the dosing or control tank 13, being suitably packed and secured in an opening 59 in said wall. This dosing tank includes the main chamber 60 and the supplemental chamber 14, and is preferably constructed of concrete, although wooden or metal tanks may be utilized. For a portion of its bottom, the chamber 60 is provided with a sloping or inclined wall 61, which is preferably of a length slightly greater than the bottom wall 62, which is disposed in stepped relation downwardly of the bottom 61 and is horizontal or substantially so. The division wall 63 defining the chambers 60 and 14, has embedded therein the U-shaped syphon pipe 64, one end of the longer leg 64′ of which extends above the bottom 62 and carries the usual bell 65 and air release device 66. The other end of the shorter leg 64″ of the syphon communicates with an outlet pipe 67 embedded in the wall 63 at a point below the upper end of the longer leg of the syphon, and this pipe 67 opens into the chamber 14. The chamber 14 is considerably deeper than the maximum depth of the chamber 60, but is of less area than the same, and the wall 63 adjacent the bottom of chamber 14 e. g., from the pipe 67 is inclined as shown at 68. This inclined wall 68 is shown as being formed in the wall 63 and extending from the pipe 67 downwardly, but it may well be in the end wall of the chamber 13 or in the side walls thereof defining the chamber 14, and in fact one or all four walls of the chamber 14 may be suitably inclined for any required distance and at any required angle, provided the critical relative proportions of the area, depth and volume between the chamber 14 and the chamber 60 are preserved. The bottom 69 of the chamber 14 which is below the maximum depth of the bottom of the main chamber communicates with a pipe 70 by which effluent is drained from the chambers 60 and 14, which pipe 70 communicates with the line 15 leading to the nozzles 16 disposed above the filter bed.

The syphon above described is of the air actuated type, and when the water level in the chamber 60 reaches the line indicated at 71, the pressure is such as to force air trapped in the bell out through the vent device 66 and permit effluent to drain from chamber 60 into the chamber 14 through pipe 67. The ingress of the effluent into the chamber 14 is initially at a considerable velocity and a head of effluent builds up within the chamber 14 due to the restricted openings in the nozzles 16. There is also initially, as this head builds up, some surging and the head in the chamber 14 acts as a cushion both to break up the high velocity of the stream entering through the pipe 67 and prevent the effects of the surging and the initial high velocity reaching the line 15 whereby the spray discharged by the respective nozzles gradually increases or progresses in diameter outwardly from the nozzle openings as centers to a determined maximum which is substantially the maximum area of the filter bed.

The head of effluent in the chamber 14 builds up to a level substantially equal to that now prevailing in the chamber 60 which liquid level of course is continuously decreasing. When the level in the chamber 14 reaches the level in the chamber 60, the water level in each chamber lowers at the same rate, i. e., the rate at which the effluent discharges from the spray nozzles 16. The outflow from the chambers 60 and 14 through the pipe 70 continues until the level in the chamber 60 is slightly above the lower edge of the bell 65 at which time air will enter the bell and lock the syphon, preventing further flow through the syphon and pipe 67 to the chamber 14. When the syphon has locked, the head of the effluent in the deeper chamber 14 will continue to drain through the pipe 70 and it is to be noted that while the chamber 14 is of smaller area it is of considerably greater depth than the maximum depth of the chamber 60. Hence, the head remaining in the chamber 14 after the syphon has locked, creates a substantial pressure which decreases as the liquid level moves downwardly in the chamber 14. This pressure created by the head remaining in the chamber 14 is critical with relation to the size of the openings of the nozzle 16, so that practically, until fluid has drained from the bottom 69 of the chamber 14, there is present enough pressure to produce a spray of progressively decreasing diameter from the nozzle openings as centers upon the filter bed, and there is no weeping except for a small volume of water remaining in pipe 15 which is negligible so far as puddling about the nozzles is concerned.

This construction of the dosing or control chamber wherein one of the chambers has a relatively large area and reduced depth and the other chamber which communicates with a line leading to the spray nozzles has a reduced area, but a substantially increased depth, assures in cooperation with the restricted openings in the nozzles (1) that when the effluent is initially introduced to the nozzles from chamber 14, a spray will be formed progressively increasing in diameter about each nozzle as a center, to a maximum diameter in accordance with the head of effluent present in the chamber 14, which maximum will usually bring the effluent into contact with the outside areas of the filter bed as designed, and (2) that when the syphon locks as above explained, the head of effluent remaining in the chamber 14 and draining therefrom will exert a sufficient pressure to cause a spray to be maintained which is of progressively decreasing diameter about each nozzle as a center, in accordance with the progressively decreasing head in the chamber 14 until the effluent entirely drains therefrom.

It will be understood from the preceding description that the discharge from the chamber 60 is intermittent in accordance with the flow of effluent thereto from the settling tank, and that each time the chamber 60 is discharged, the spray from the nozzles progressively increases in diameter about the nozzles as centers to a maximum determined by the head in the chamber 14 so as to contact the whole area of the filter bed as designed, and then progressively decreases in diameter from this maximum so that there is a uniform distribution of the effluent over the entire area of the filter bed. In other words, equal volumes of effluent are progressively brought into contact with each unit area of the filter bed, e. g., per square foot. Furthermore, a spray is maintained until the chamber 14 is entirely drained and there is no trickling or weeping at the nozzles, the spray and out-flow sharply terminating when the chamber 14 is completely drained.

Referring to Figure 2, the filter bed 16' is of usual construction, preferably of crushed rock or stone and of a depth to afford the desired aerobic treatment. The pipe 15 communicates with the nozzle connections 71 which carry the nozzles 16 and the nozzles are so positioned on the connections 71 that when the effluent is being discharged, the spray will encompass substantially the entire filter bed area. As heretofore explained, the spray progressively increases with respect to the area of the filter bed until a maximum is reached and then progressively decreases, each time the chamber 60 is discharged.

By weeping at the nozzles in this specification is meant a continuous trickling or flowing as a stream, of effluent from the nozzles which would interfere with the uniform distribution of effluent to the filter bed as accomplished by this invention. In the present case, such weeping or trickling is substantially entirely avoided and as heretofore stated, except for a slight quantity of effluent which may remain in the line 15, the spray shuts off sharply when the chamber 14 is drained, but the spray continues up until the effluent is drained entirely from the bottom of the chamber 14.

We have referred above to the inclined wall 68 in the chamber 14. The inclination of this wall or other walls of the chamber 14 so decreases the area of the chamber 14 as to (1) aid in maintaining a head of effluent within the chamber 14 against the spray nozzles so that the discharge from the nozzles will be in the form of a spray until the chamber 14 is entirely drained, and (2) assures that immediately the chamber is drained, the spray will be sharply cut off, thereby eliminating weeping at the nozzles. As explained, the extent of this inclination and relative decreasing in area of the chamber 14 may be varied but at all times, it is maintained so as to produce a head against the nozzles which will assure a constant spray of the effluent.

It will be observed moreover that discharge of the chamber 60, causes the spray to increase in diameter outwardly to its maximum. At the time this maximum is reached, or substantially thereabout, the pressure in the chamber 60 has decreased to a point that the syphon locks and thereafter the discharge from the chamber 14 forming a progressively decreasing spray occurs. While the actuation of the syphon is intermittent, the flow into the chamber 60 is continuous and the release of the flow from the chamber 60 through the syphon to the chamber 14 is automatic.

We claim:

1. The method of sewage disposal which comprises collecting, digesting and clarifying the sewage in a primary digestion tank, discharging the clarified effluent therefrom at a rate corresponding to the introduction of additional sewage to said tank, collecting the clarified effluent in a collecting tank until a predetermined hydrostatic head is created therein, then syphoning the effluent from said tank into a discharge tank, simultaneously discharging effluent from the latter tank and raising the level of the liquid therein by a flow from said collecting tank, terminating the flow from the collecting tank to the discharge tank, and continuing the discharge of liquid from the latter tank until it is completely drained.

2. The method of sewage disposal which comprises digesting and clarifying the sewage, conducting the clarified effluent to a collecting tank and storing the same therein until a predetermined hydrostatic head is created therein, then syhoning the effluent from the collecting tank to a dosing tank, discharging the effluent from the dosing tank and spraying the same upon a filter bed, gradually increasing the head of liquid in the dosing tank by a continuation of the flow of liquid from the collecting tank, thereby increasing the head of liquid operating on the spray and gradually increasing the area covered by the spray, increasing the volume of liquid sprayed at each increased head level, terminating the flow of effluent from the storage tank to the dosing tank when the head in the former drops to a predetermined level, continuing the discharge of liquid from the dosing tank thereafter, and thereby decreasing the head of liquid in the dosing tank and the area of spray on the filter bed, and decreasing the volume of liquid sprayed at each decreased head level until the dosing tank is empty.

3. The method of sewage disposal which comprises digesting and clarifying the sewage and subjecting the same to anaerobic bacterial action, automatically and continuously conducting the clarified effluent to a storage chamber and collecting the effluent therein, and while said effluent continues to flow into the storage chamber and when a predetermined upper level in said storage chamber is reached automatically discharging the effluent from said chamber to a supplemental chamber and substantially simultaneously from the chambers to a spray head discharging upon the upper surface of a trickling filter bed, cutting off flow from the storage chamber to the supplemental chamber when the effluent level in the storage chamber drops to a predetermined level, and then while effluent continues to collect in the storage chamber continuing without interruption the discharge of effluent to the spray from said supplemental chamber until the supplemental chamber is substantially exhausted of effluent, the effluent discharged to the spray from the storage and supplemental chambers forming a spray of progressively increasing diameter and the effluent discharged to the spray from the supplemental chamber after cutting off flow between the storage and supplemental chambers producing a spray of progressively decreasing diameter upon a filter bed whereby the effluent is subjected to aerobic bacterial action.

4. The method of sewage disposal which comprises collecting, digesting and clarifying the sewage in a primary digestion tank, discharging the clarified effluent therefrom at a rate corresponding to the introduction of additional sewage to said tank, collecting the clarified effluent in a collecting tank until a predetermined hydrostatic head is created therein, then automatically discharging the effluent from said tank into a discharge tank, simultaneously discharging effluent from the latter tank and raising the level of the liquid therein by the discharge from said collecting tank, automatically terminating the flow from the collecting tank to the discharge tank, and continuing the discharge of liquid from the latter tank until it is completely drained.

5. A method in accordance with claim 3 wherein the automatic discharging of the effluent to the supplemental chamber is accomplished by syphoning.

6. A sewage disposal apparatus comprising a clarifying tank, means for introducing effluent to said tank, a control chamber comprising a main chamber and a supplemental chamber, means communicating with said tank and control chamber for passing effluent from said tank to the main chamber of the control chamber, an outlet adjacent the bottom of the supplemental chamber for discharging effluent from said supplemental chamber, said main chamber being of substantially greater area and substantially less depth than said supplemental chamber, automatic means for intermittently establishing communication between the main and supplemental chambers, said means adapted to automatically establish communication between the chambers when effluent in the main chamber reaches a predetermined upper level and to automatically shut off communication between the chambers when the effluent in the main chamber reaches a predetermined lower level, said supplemental chamber discharging through said outlet when communication between the chambers is established and continuing to discharge through the outlet when communication between the chambers is shut off until the supplemental chamber is substantially empty, a conduit communicating with said outlet and terminating in a spray, and a filter bed for receiving effluent from said spray.

7. The sewage disposal apparatus in accordance with claim 6 wherein the automatic means for intermittently establishing communication between the chambers includes a syphon; wherein the fluid discharging through said spray is in the form of a spray progressively increasing in diameter over said filter bed as the main and supplemental chambers discharge and wherein the secondary chamber is of such area and depth that when communication is shut off between the chambers, and the supplemental chamber only is discharging, the discharge from the outlet over the filter bed will be in the form of a spray progressively decreasing in diameter.

WILLIAM N. BISPHAM.
JAMES C. BELL.